July 18, 1967 J. W. EDWARDS ET AL 3,331,941
INFRARED HEATER

Filed Dec. 26, 1963 2 Sheets-Sheet 1

INVENTOR.
JAMES W. EDWARDS
RICHARD K. SHELBY
BY *Robert J. Schaap*

ATTORNEY

United States Patent Office 3,331,941
Patented July 18, 1967

3,331,941
INFRARED HEATER
James W. Edwards, Creve Coeur, Mo., and Richard K. Shelby, Downers Grove, Ill., assignors to Monsanto Company, a corporation of Delaware
Filed Dec. 26, 1963, Ser. No. 333,468
5 Claims. (Cl. 219—354)

ABSTRACT OF THE DISCLOSURE

A heating device for molding machines which form articles from thermoplastic sheet-material, wherein the heating device comprises a vertically elongated housing having a highly reflective inner surface and having a downwardly facing concave electric radiant heater vertically adjustably mounted therein. A transmitter consisting of alternating layers of germanium and cryolite substantially spans the lower open end of said housing and is designed to preferentially transmit infrared radiation within a wave-length range of 2.85 to 3.75 microns. A fan is provided to draw cooling air upwardly through the housing past the peripheries of the transmitter and the heater.

---

This invention relates in general to certain new and useful improvements in infrared heaters and more particularly to an infrared heater having selective transmitting means.

In recent years, it has become a common practice in the manufacture of thin-walled disposable containers such as cups and dishes, to employ thermoplastic materials such as styrene, polystyrene and modified polystyrene as the material of construction. These materials are particularly adaptable for use in molding machines of the type described in United States Letters Patent No. 2,967,328 wherein a sheet of thermoplastic material is passed between a pair of cooperating die elements. In this operation, a selected area of the thermoplastic material is formed within a cavity of one of the die elements. However, this material must be preheated to a desired temperature immediately prior to the molding operation to the point where it is sufficiently flexible and viscous so as to be formable within the die elements.

The prior art has provided many methods and heaters such as Calrod heaters for preheating the sheets of thermoplastic materials. These heaters are relatively inefficient since they are not compatible with the thermoplastic material and moreover, are not designed to emit radiation within the wave length range of absorptivity of the web of thermoplastic material. In an effort to reduce the power consumption and the excess heat created by the preheaters of the prior art, many designers have attempted to design heaters which are capable of emitting radiation within selected wave length ranges, these wave length ranges being selected to cover the wave length range of absorption of the web of thermoplastic material. However, studies of spectral distribution curves for available sources of energy have shown that practically all heaters emit radiation within a wide spectral range and that it is very difficult to concentrate the heat in any particular spectral region. As a result thereof, the selective heaters of the prior art have been relatively inefficient and did not overcome the problems that they were designed to obviate.

It is therefore, the primary object of the present invention to provide a heater which is capable of emitting radiation within a relatively narrow spectral wave length range.

It is another object of the present invention to provide a heater of the type stated which is relatively efficient and has a low power consumption.

It is a further object of the present invention to provide a selective transmitter with the aforementioned heater for selectively transmitting radiation within a selected wave length range.

It is an additional object of the present invention to provide a selective transmitter of the type stated which can be manufacured at a low unit cost and is capable of withstanding relatively high temperatures.

It is another salient object of the present invention to provide a selective transmitter of the type stated which has a high efficiency rating for selectively transmitting desired wave length ranges.

With the above and other objects in view, our invention resides in the novel features of form, construction, arrangement, and combination of parts presently described and pointed out.

Figure 1:
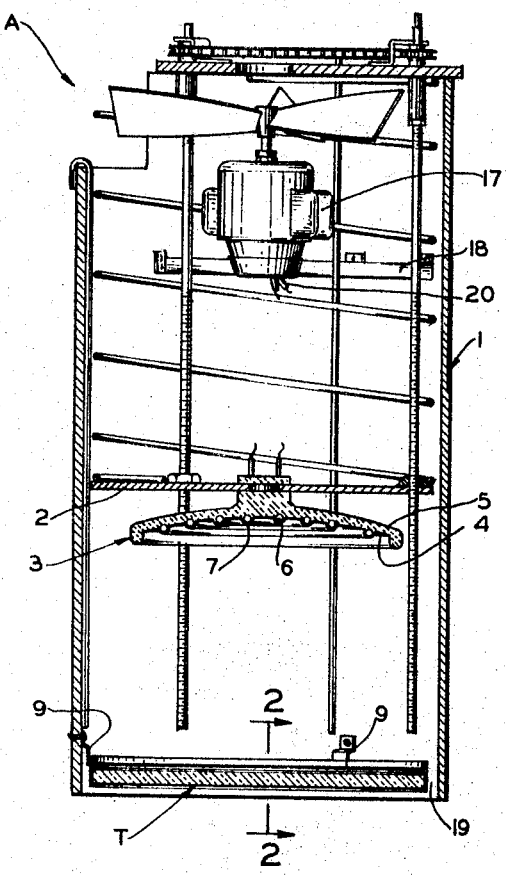
FIGURE 1 is a vertical sectional view showing a heater and a selective transmitter suitably mounted within a heater housing.

Generally speaking, the present invention relates to a selective transmitter which is used in conjunction with the heating apparatus described in copending application Ser. No. 333,508 filed Dec. 26, 1963. In this aforementioned copending application, the heater is designed to emit radiation within the wave length range of from 3.2 to 3.5 microns, which is the wave length range most compatible for the thermoplastic material also described in said aforementioned copending patent application.

The selective transmitter of the present invention generally consists of a substrate which is transparent at least within the wave length range of 3.2 to 3.5 microns and having a series of alternating layers of materials having high and low refractive indices respectively, applied to one of its flat surfaces.

Referring now in more detail and by reference characters, to the drawings, A designates a heating device comprising a heater housing 1, which is more fully described in the aforementioned copending patent application Ser. No. 333,508. Operatively mounted on a shiftable plate 2 in a heater 3 also described more fully in the aforementioned copending patent application. However, it will suffice to point out for purposes herein, that the plate 2 is shiftable within the housing 1 for the greater portion of its length and the heater 3 which is rigidly mounted on the plate 2 is carried therewith.

It can be seen by reference to FIGURE 1 that the heater 3 has an inverted dish-shaped vertical cross section with an arcuately shaped downwardly presented concave bottom wall 4 and a matching top wall 5. By further reference to FIGURE 1, it can be seen that the heater 3 is integrally formed with a series of connecting channels 6 for accommodating a continuous coil heater wire or emitter 7, which is ultimately connected to a suitable source of electrical current (not shown). It can be seen that the heater wire 7 is located so that it is displaced from a horizontal plane coincident with the peripheral margin of the heater casing at various distances. Accordingly, the portion of the heater wire 7 along the peripheral margin of the casing is substantially coincident with this horizontal plane, whereas the portion of the heater wire 7 located at the geometric center of the bottom wall 4 is displaced from the horizontal plane. Moreover, the portions of the heater wire 7 which are located between the geometric center of the bottom wall 4 and the peripheral margin thereof are displaced from the horizontal plane coincident with the peripheral margins of the bottom wall 4 by a distance which is linearly proportional to the radial displacement from the peripheral margins. By means of this construction, it is possible to eliminate the tendency of the radiation to concentrate and cause local hot spots on a receiver such as a web of thermoplastic material.

The thermoplastic material which is designed to be used with the heater 3 is also more fully described in the aforementioned copending patent application and is generally designed to accommodate radiation within the wave length range of 3.2 to 3.5 microns. Accordingly, the heater 3 is designed to emit radiation within this wave length range. However as previously pointed out, the heaters of the aforementioned type are not 100% efficient and consequently there is emission of radiation at wave lengths less than 3.2 microns and at wave lengths greater than 3.5 microns. In effect, there is no scientific method for producing a heater which is turned to deliver a preponderance of its radiation in any micron band. However, the heater 3 has been found to be far more successful than any of the heaters now in the prior art.

Figure 2:
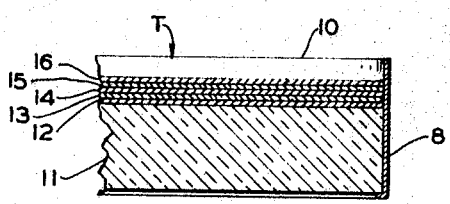
FIGURE 2 is a vertical fragmentary sectional view taken along line 2—2 of FIGURE 1.

In order to increase the efficiency of the heater 3, a transmitter T is rigidy mounted at the lower end of the housing 1 and is designed to minimize transmission of radiation from the heater 3 which is not contained within the wave length range 2.85 to 3.75 microns. The transmitter T includes a cyclindrical supporting ring 8, preferably formed of aluminum and which is provided with a plurality of radially spaced upstanding brackets 9 for securement to the interior surface of the cylindrical side wall of the housing 1. The supporting ring 8 is designed to retain a dichroic filter 10 which is supported by a transparent quartz substrate 11, substantially as shown in FIGURE 2. While the substrate 11 selected is quartz, it should be understood that any medium which is transparent within the wave length range of 3.2 to 3.5 microns could be employed. The filter 10 which is of the multilayer film type, is suitably applied to the undersurface of the quartz substrate 11 by any suitable method of depositing thin layers. The filter 10 consists of alternating layers of germanium and cryolite. A germanium layer 12, which is a high index of refraction material, is facewise deposited on one flat surface of the substrate 11. A layer of cryolite 13 having a low index of refraction is then facewise deposited on the surface of the germanium layer 12. This is followed by identical layers 14, 15 of germanium and cryolite respectively and which are identical to the layers 12, 13 respectively. Finally, the filter 10 is terminated with an outer layer of germanium 16. Each of the germanium layers is designed so that they have an optical thickness of ½ wave length for the center of the wave length range to be reflected. Each of the cryolite layers is designed with an optical thickness of ¼ wave length for the center of the wave length range to be reflected. In the case of the present invention, it is desired to transmit radiation within the wave length range of 3.2 to 3.5 microns and reflect radiation having a wave length less than 3.2 microns and radiation having a wave length greater than 3.5 microns. Consequently, the optical thickness of each of the layers forming part of the filter 10 was designed with respect to a transmitted wave length of 3.35 microns. The substrate 11 is of sufficient thickness so that it constitutes a "massive" layer and therefore, does not interfere with the transmission of radiation in the system.

The transmitter T of the present invention is suitably designed for use with the heating system and compositions of the present invention, the compositions of which are hereinafter described. While it is recognized that no transmitter heretofore developed has been 100% efficient, the transmitter T has achieved a high degree of efficiency in the present invention. It is designed to provide transmission of radiation within the wave length range of 2.85 to 3.7 microns which is slightly greater than the wave length range of 3.2 to 3.50 microns. The filter, however, is only highly reflective within the wave length range of 1.95 to 2.85 microns and 3.7 to 8.5 microns, but is not reflective as to radiation having a wave length of less than 1.95 or to radiation having a wave length greater than 8.5 microns. However, due to the highly reflective nature of the matellic germanium, this material is highly opaque at wave lengths less than 1.98 microns and is therefore highly reflective when the wave length range is less than 1.98 microns. Moreover, the quartz substrate is relatively opaque beyond 4½ microns, and therefore becomes highly reflective. Therefore, it can be seen that the transmitter T is designed to provide maximum transmittance within a pass band range of 2.85 to 3.75 microns and will effectively reflect any radiation which is not within this pass band range. The reflective radiation which is held within the housing 1, is re-absorbed as heat and then re-emitted in the full spectrum. In other words, the energy which is not contained within the transmission band is recycled and with each cycle is partially converted to the desired wave length range and thereby materially increases the efficiency of the heater 3. Due to the fact that the housing 1 is constructed of aluminum, it is a good conductor of heat and the radiation which is not included in the pass band range and is reflected back into the housing can be dissipated through the walls of the housing 1, if it is not absorbed. It may be desirable to coat the filter 10 with a silicon monoxide or silicon dioxide coating to protect the same from the high temperature maintained by the heater 3.

When the aforementioned heater assemblies are employed in molding machines of the type described in United States Letters Patent 2,967,328, it may not be possible to dissipate the heat collected within the housing 1 as rapidly as desirable. Accordingly, a relatively small conventional electric fan 17 is suitably mounted on a web consisting of three radially extending arms 18, which are secured to the interior surface of the housing 1. By reference to FIGURE 1, it can be seen that the fan 17 is of the exhaust type and is mounted in upwardly spaced relation to the plate 2 and heater 3. The transmitter T has a slightly smaller diametral size than the housing 1, thereby providing an air space 19 through which air can pass. The fan 17 is also provided with a pair of electrical conductors 20 for ultimate connection to a suitable source of electrical current (not shown). Thus when the fan 17 is actuated, it will pull cooling air through the space 19, around the heater 3, and exhaust the same through the upper end of the housing 1. In this manner, it is possible to vent some of the collected heat within the housing 1.

It should be understood that the transmitter T could be located at any position with respect to the heater 3 and does not necessarily have to be mounted in close proximity to the lower margin of the housing 1. However, it is, of course, necessary that the transmitter T have a diametral size which is approximately equal to the diametral size of the housing 1 so that all radiation emitted from the heater 3 will contact the transmitter T, but which is at least sufficient to afford the air space 19.

The transmitter T can also be conveniently used in beam splitters, reflectors for optical instruments, one way mirrors, and even sun glasses or similar types of optical devices where it is desirable to alter the properties of radiation from an emitter.

Figure 3:
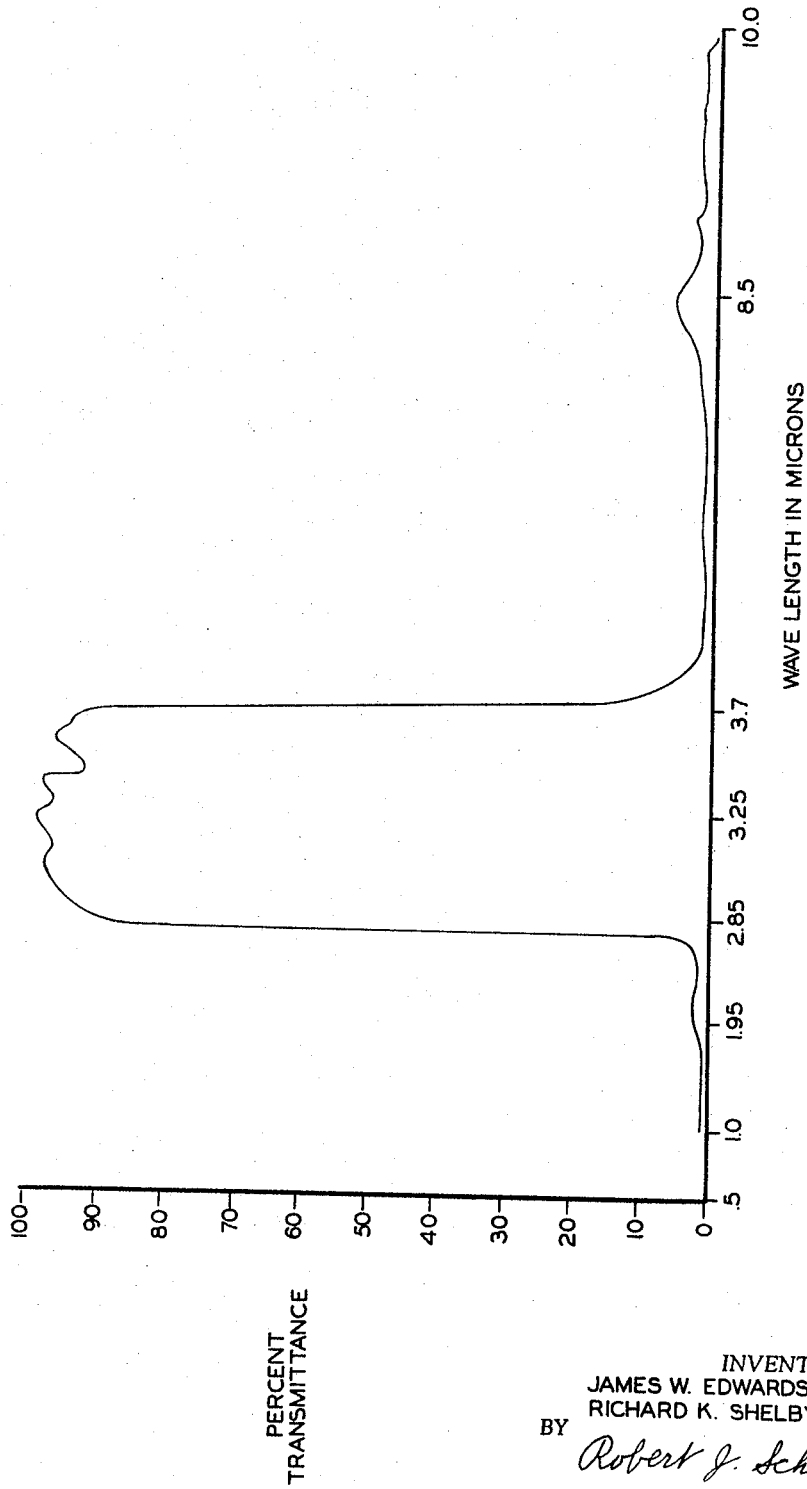
FIGURE 3 is a graphical illustration of a typical transmittance curve showing a percentage of transmitted radiation from the heater for a given wave length range of radiation when the radiation is passed through a selective transmitter constructed in accordance with the present invention.

FIGURE 3 is a graphical illustration of a typical transmittance curve for the transmitter T when used in combination with the heater 3. This curve shows the plot of the percentage of transmitted radiation from the heater as a function of the wave length of radiation in microns. It can be seen by reference to this transmittance curve, that when the radiation is directed thereupon, at an angle of incidence of 0°, approximately 95% of the radiation contained within the wave length range of 2.85 to 3.70 microns was transmitted. Beyond the range of 3.70 microns and at wave lengths less than 2.85 microns, virtually all of the radiation was reflected. It is true that beyond 8.5 microns a small amount of radiation was transmitted through the filter. However, at this wave length range, the power consumed to produce this radiation and the ultimate heat loss is very small.

The plot of FIGURE 3 decidedly illustrates the advantage of employing the transmitter T in radiation systems of the type described. It can be seen that practically all of the radiation which is not contained within the pass band region is recycled into the heater housing 1. This radiation is then partially converted to the desired wave length range and emitted in the selected pass band range. With this construction, the effectiveness and the efficiency of the heater is materially increased. It should also be noted that while the transmittance curve shows a number of ripples or so-called subsidiary reflectance maxima in the pass band range, these reflectance maxima are considerably reduced with the transmitter T.

It should be understood that changes and modifications can be made in the form, construction, arrangement and combination of parts presently described and pointed out without departing from the nature and principle of our invention.

Having thus described our invention what we desire to claim and secure by Letters Patent is:

1. A device for heating sheets of thermoplastic material and the like comprising in combination a heater having an outer casing and a heating element capable of emitting infrared radiation, and a preferential transmitter comprising alternating layers of cryolite and germanium for preferentially transmitting radiation within a desired wave length range.

2. A heating device for molding machines and the like which are adapted to mold articles from sheets of thermoplastic material; said device comprising a housing which is adapted to be mounted on said molding machine in spaced relation to the sheet of thermoplastic material, an emitter operatively mounted in said housing, a supporting element mounted within said housing in spaced relation to said heater, a substrate retained by said supporting element and being substantially transparent in the wave length range of radiation transmitted by said emitter, and a selective transmitting filter on said substrate comprising alternating layers of germanium and cryolite for preferentially transmitting radiation within a desired wave length range said germanium layers having an optical thickness of one-half wave length for the center of the wave length range to be reflected, said cryolite layers having an optical thickness of one-fourth wave length for the center of the wave length range to be reflected.

3. A heating device for molding machines and the like which are adapted to mold articles from sheets of thermoplastic material; said device comprising a housing which is adapted to be mounted on said molding machine in spaced relation to the sheet of thermoplastic material, an emitter operatively mounted in said housing, a supporting element mounted within said housing in spaced relation to said heater, a substrate retained by said supporting element and being substantially transparents in the wave length range of radiation transmitted by said emitter, and a selective transmitting filter on said substrate comprising alternating layers of germanium and cryolite for preferentially transmitting radiation within a desired wave length range.

4. A heating device for molding machines and the like which are adapted to mold articles from sheets of thermoplastic material; said device comprising a housing which is adapted to be mounted on said molding machine in spaced relation to the sheet of thermoplastic material, an emitter operatively mounted in said housing, a supporting element mounted within said housing in spaced relation to said heater, a substrate retained by said supporting element and being substantially transparent in the wave length range of radiation transmitted by said emitter, and a selective transmitting filter on said substrate comprising alternating half wave length layers of germanium and alternating quarter wave length layers of cryolite based on a wave length of 3.25 microns for preferentially transmitting radiation in the wave length range of 2.85 to 3.7 microns.

5. A device for heating sheets of thermoplastic material and the like comprising in combination a heater having an outer casing, a heating element capable of emitting infrared radiation operatively mounted in said casing, a preferential transmitter comprising alternating layers of cryolite and germanium operatively associated with said heater and being adapted to transmit radiation within the wave length range of 3.2 to 3.5 microns, and a blower means operatively mounted in said housing in upwardly spaced relation to said emitter and being adapted to exhaust cooling air through said housing.

References Cited
UNITED STATES PATENTS

| | | |
|---|---|---|
| 2,412,496 | 12/1946 | Dimmick. |
| 2,864,932 | 12/1958 | Forrer _____ 219—553 X |
| 3,008,844 | 11/1961 | Grunin et al. |
| 3,033,701 | 5/1962 | Wozniak. |
| 3,045,100 | 7/1962 | Mills _____ 219—354 |

RICHARD M. WOOD, *Primary Examiner.*

ANTHONY BARTIS, *Examiner.*

R. F. STAUBLY, *Assistant Examiner.*